US006476154B1

(12) United States Patent
Maly et al.

(10) Patent No.: US 6,476,154 B1
(45) Date of Patent: Nov. 5, 2002

(54) USE OF CARBON BLACK IN CURABLE RUBBER COMPOUNDS

(75) Inventors: Neil Arthur Maly, Tallmadge, OH (US); Jerry Donald Hunt, North Canton, OH (US); Dennis Keith Romain, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 58 days.

(21) Appl. No.: 09/675,079

(22) Filed: Sep. 28, 2000

(51) Int. Cl.$^7$ .................................................. C08F 8/34
(52) U.S. Cl. ............................... 525/332.6; 525/332.1; 525/333.1; 525/333.2; 524/495; 524/492
(58) Field of Search ................................ 524/495, 492; 525/332.1, 332.6, 333.1, 333.2

(56) References Cited

U.S. PATENT DOCUMENTS 5,750,615 A * 5/1998 Lukich et al. .............. 524/495
5,997,837 A 12/1999 Lynum et al.
6,068,827 A 5/2000 Lynum et al.

FOREIGN PATENT DOCUMENTS

WO    WO 98/42621    10/1998
WO    WO 98/42621 A1 * 10/1998 ........... C01B/31/04

OTHER PUBLICATIONS

Krishnan, A.; Dujanrdin, E.; Treacy, M. M. J.; Hugdahl, J.; Lynum, S.; Ebbesen, T. W. Nature 1997, 338, 451.*
A. Krishnan; et al, "Graphite cones and the nucleation of curved carbon surfaces," Letter to Nature, p. 451–454.
Karbomont, "Plasma Black Technical Data,".

* cited by examiner

Primary Examiner—David W. Wu
Assistant Examiner—Rip Lee
(74) Attorney, Agent, or Firm—Henry C. Young, Jr.; John D. DeLong

(57) ABSTRACT

A rubber composition is provided comprising a diene-based elastomer, a vulcanizing agent, a vulcanizing accelerator and a reinforcement comprising a conical carbon. The conical carbon comprises cones, flat plates, nanotubes and fullerenes. Also provided is a tire having at least one component fabricated from the rubber composition.

26 Claims, 1 Drawing Sheet

USE OF CARBON BLACK IN CURABLE RUBBER COMPOUNDS

FIELD OF THE INVENTION

The invention relates generally to the use of non-conventional forms of carbon black in curable rubber compounds. The non-conventional carbon black generally includes particles in the shape open conical structures to enhance properties of rubber compounds, particularly for use in tires.

BACKGROUND OF THE INVENTION

Pneumatic rubber tires are conventionally prepared with at least one component, such as, for example, a rubber tread, which is often a blend of various rubbers and reinforced with conventional, granular carbon black. For example, a non-limiting list of such rubbers would include at least one, and more often two or more, of styrene/butadiene copolymer(s) (SBR), cis-1,4-polyisoprene including natural rubber, cis-1, 4-polybutadiene and styrene/isoprene/butadiene terpolymer(s) as well as other elastomers. Further, such tires may, for example, have a tread composed of natural rubber, a tread composed of a blend of SBR and cis-1,4-polybutadiene rubbers, a tread composed of natural rubber and SBR as well as treads composed of tri-blends such as SBR (40 to 60 phr) with 20 to 45 percent styrene, cis-1,4-polyisoprene (20 to 30 phr) and cis-1,4-polybutadiene (20 to 30 phr). For example, see *The Vanderbilt Rubber Handbook*, 13$^{th}$ Edition (1990), Pages 603 and 604.

The characteristics of carbon black are a significant factor in determining various properties of a rubber composition with which the carbon black is compounded. Conventionally, for rubber reinforcement, tire tread rubber compositions use high surface area, elastomeric reinforcing granular carbon blacks for a purpose of providing tread rubber compositions with good traction and abrasion resistance. On the other hand, in order to enhance the fuel efficiency of a motorized vehicle, a decrease in the rolling resistance of the tire tread portion is desirable. There are some indications that this has been achieved, for example, by increasing the resilience of the rubber by using carbon blacks having a large particle diameter and a small surface area or granular carbon blacks having a wide range of aggregate size distribution per given particle diameter.

It is believed to be conventional wisdom that a tire tread composition designed to improve tread traction on the road usually results in a tire's increased tire rolling resistance. Similarly, modifying a tire tread composition to improve (reduce) a tire's rolling resistance usually results in a reduction in the tire tread traction and/or treadwear resistance. It is usually difficult to impart both high abrasion resistance and high resilience to the rubber at the same time, because the requirements have been thought to be somewhat contradictory with each other from the perspective of the properties of the granular carbon black in the rubber. These aspects involving a trade-off of tire, or tire tread, properties (traction, rolling resistance and treadwear) are well known to those having skill in such art. Thus, selection of various reinforcing carbon blacks tend to play a role in the ultimate properties of the rubber composition.

For some tire tread applications, silica is used for at least a portion of the rubber reinforcement, often in conjunction with the granular carbon black, and usually accompanied by a silica coupler.

The term "phr" as used herein, and according to conventional practice, refers to "parts of a respective material per 100 parts by weight of rubber elastomer". In the description of this invention, the terms "rubber" and "elastomer" can be used interchangeably, unless otherwise distinguished. The terms "rubber composition", "compounded rubber" and "rubber compound" can be used interchangeably to refer to "rubber which has been blended or mixed with various ingredients and materials" and such terms are well known to those having skill in the rubber mixing or rubber compounding art. The terms "granular carbon black" are used herein to refer to conventional carbon blacks, the use of which in rubber compositions is well known in the art. Generally, granular carbon black may be characterized as a multiplicity of elementary graphitic particles fused together to form grape-like aggregates familiar to those skilled in the art. Further description of conventional carbon black morphology can be found on Pages 398 through 410 of *The Vanderbilt Rubber Handbook*, 13$^{th}$ Edition.

SUMMARY AND PRACTICE OF THE INVENTION

In accordance with the present invention, a rubber compound is provided with an amount of conical carbon black for reinforcement, the conical carbon black comprising open conical carbon structures and flat plates.

The invention also relates to a tire having at least one portion composed of a rubber composition which contains, as reinforcement, a conical carbon black comprising open conical carbon structures which is useful as a reinforcement in rubber compounds in place of at least a portion thereof or in addition to, the normally used forms of granular carbon black reinforcement.

Such non-conventional, conical carbon black may be used as discrete particles and/or aggregates and agglomerates of such particles.

The term carbon black is herein used, unless otherwise indicated, in a broad sense to include any particulate graphitic material, including granular carbon blacks conventionally used as reinforcements in tires and rubber as well as other, nonconventional forms of particulate graphite. By carbon black comprising open conical structures, it is meant to be any carbon black comprising open conical carbon structures and flat plates, but may also comprise minor amounts of fullerenes, carbon nanotubes, and other graphitic structures. The terms "conical carbon", "conical carbon black", "open conical structures", "cones and plates", "cones and flat plates", and "microcones" are herein used interchangeably to refer to the unconventional carbon black used in the rubber composition of the present invention.

According to this invention, a tire is provided having a tread of a rubber composition comprised of, based on 100 parts by weight rubber (A) 100 parts by weight (phr) of at least one diene-based elastomer and (B) about 10 to about 150, alternatively about 20 to about 100, phr of particulate elastomer reinforcement composed of about five to about 100, alternately about 10 to about 60, weight percent of at least one conical carbon black and from zero to about 95, alternately about 60 to about 10, weight percent of at least one of granular carbon black and, optionally, precipitated silica; wherein said conical carbon black has conical and flat plate shaped particles characterized by a topological disclination TD given by the general formula $TD = N \times 60$ degrees, where $N=0, 1, 2, 3, 4,$ or $5$ The structure of such conical particles and flat plates can be grossly described as stacks of graphitic sheets with flat (N=0) or conical structures (N=1 to 5), and holding cone angles of 180, 112.9, 83.6, 60.0, 38.9, and 19.2 degrees for each of N=0 to 5, respectively. The characteristic size, or longest dimension, of the particles is typically less that 5 micrometers and the thickness, measured as the wall thickness of the hollow cones or the thickness of the flat plate, is typically less than 100 nanometers. Cones of N=1 to 5, nanotubes, and fullerenes may make up about 20 percent of the conical carbon black, with the remaining about 80 percent being mainly flat plates of N=0. Alternatively, flat plates of N=0, TD=0 and a projected angle of 180° may be present as a major fraction of the conical carbon black, that is, in excess of 50 percent by weight. Cones of N=1, 2, 3, 4, or 5, fullerenes, or nanotubes may be present as a minor fraction of the conical carbon black, that is, less than 50 percent by weight.

Alternatively, the elastomer reinforcement may also be composed of (i) about 5 to about 90, alternatively about 10 to about 50, weight percent of said conical carbon black, and correspondingly (ii) about 95 to about 10, alternatively about 90 to about 50, weight percent of at least one reinforcing filler selected from at least one of conventional granular carbon black and precipitated silica.

The conical carbon black is further characterized by having either a nitrogen adsorption number (ASTM D3037) or an Iodine adsorption number (ASTM D1510) of less than 30 g/kg and a DBP number of greater than 150 cm$^3$/100 g. Preferably, the optional granular carbon black has an Iodine adsorption value in a range of about 30 to about 150 g/kg, preferably about 100 to about 150 g/kg for tread rubber, and a DBP Number in a range of about 60 to about 140 cm$^3$/100 g, preferably about 100 to about 140 cm$^3$/100 g for tread rubber, and preferably the optional precipitated silica has a BET surface area as measured using nitrogen gas in a range of about 40 to about 600, preferably 50–300, and a DBP number in a range of about 100 to about 400, more preferably 150–300.

Such conical carbon black having cone and plate shaped particles is considered herein to be substantially open conical and planar in form, and thus, are considered herein to be, basically, extended surfaces of graphitic carbon.

A discussion of carbon having cone and plate shaped particles, herein referred to as conical carbon black, may be reviewed in an article entitled "Graphitic Cones and the Nucleation of Curved Carbon Surfaces" appearing in *Nature* (1997), July 31 issue, and further in PCT publication WO 98/42461.

In one aspect of this invention, conical carbon black can be used by itself as reinforcement for rubber compositions for tire components or it can be used in combination with more conventional granular carbon black(s).

In another aspect of this invention, the conical carbon black, imparting acceptable physical properties to rubber compounds at a lower carbon loading that needed with conventional granular carbon blacks, is used in place of more conventional granular carbon black reinforcements, thereby allowing a reduction of overall tire weight.

In another aspect, a tire is provided with a component such as a tread wherein at least one vulcanizable rubber is combined with a sufficient amount of conical carbon black or a mixture of a conical carbon black and a conventional granular carbon black, to result in a modification of the dynamic properties of the tire component as compared to those of such component for which no conical carbon had been added.

It is still yet another object of this invention to disclose a composition of at least one vulcanizable rubber, preferably at least one sulfur vulcanizable rubber, and a sufficient amount by weight of conical carbon black in comparison to the rubber to result in a modification of the dynamic properties of the rubber compared to those of the rubber without any added conical carbon black. In this embodiment, it is preferred that the tread of the rubber composition be comprised of, based on 100 parts by weight rubber (A) 100 parts by weight (phr) of at least one diene-based elastomer and (B) about 10 to about 150, alternatively about 25 to about 60, phr of particulate elastomer reinforcement composed of about five to about 100 weight percent of at least one conical carbon black and from zero to about 95 weight percent of at least one of granular carbon black and precipitated silica; wherein said conical carbon black is characterized by having topological disclination TD given by the general formula $$TD=N\times 60 \text{ degrees, where } N=0, 1, 2, 3, 4, \text{ or } 5$$

Alternatively, the elastomer reinforcement may also be composed of (i) about 5 to about 90, alternatively about 10 to about 50, weight percent of said conical carbon black, and correspondingly (ii) about 95 to about 10, alternatively about 90 to about 50, weight percent of at least one reinforcing filler selected from at least one of conventional granular carbon black and precipitated silica. The conical carbon black has an Iodine adsorption number of less than 30 g/kg and a DBP Number of greater than 150 cm$^3$/100 g. Conversely, granular carbon black has an Iodine adsorption value in a range of about 30 to about 150 g/kg, preferably about 100 to about 150 g/kg for rubber reinforcement, and a DBP Number in a range of about 60 to about 140 cm$^3$/100 g, preferably about 100 to about 140 cm$^3$/100 g for rubber reinforcement, and preferably the precipitated silica has a BET surface area as measured using nitrogen gas in a range of about 40 to about 600, preferably 50 to 300, and a DBP number in a range of about 100 to about 400, more preferably 150 to 300.

These and other aspects of this invention will be further understood when viewed in light of the drawings, further detailed description and appended claims.

BRIEF DESCRIPTION OF THE DRAWINGS

The invention may take physical form, certain parts and arrangements of parts, a preferred embodiment of which will be described in detail in the specification and illustrated in the accompanying drawings which form a part hereof, and wherein a brief description of the drawings is.

ADDITIONAL DESCRIPTION OF THE INVENTION

Figure 1:
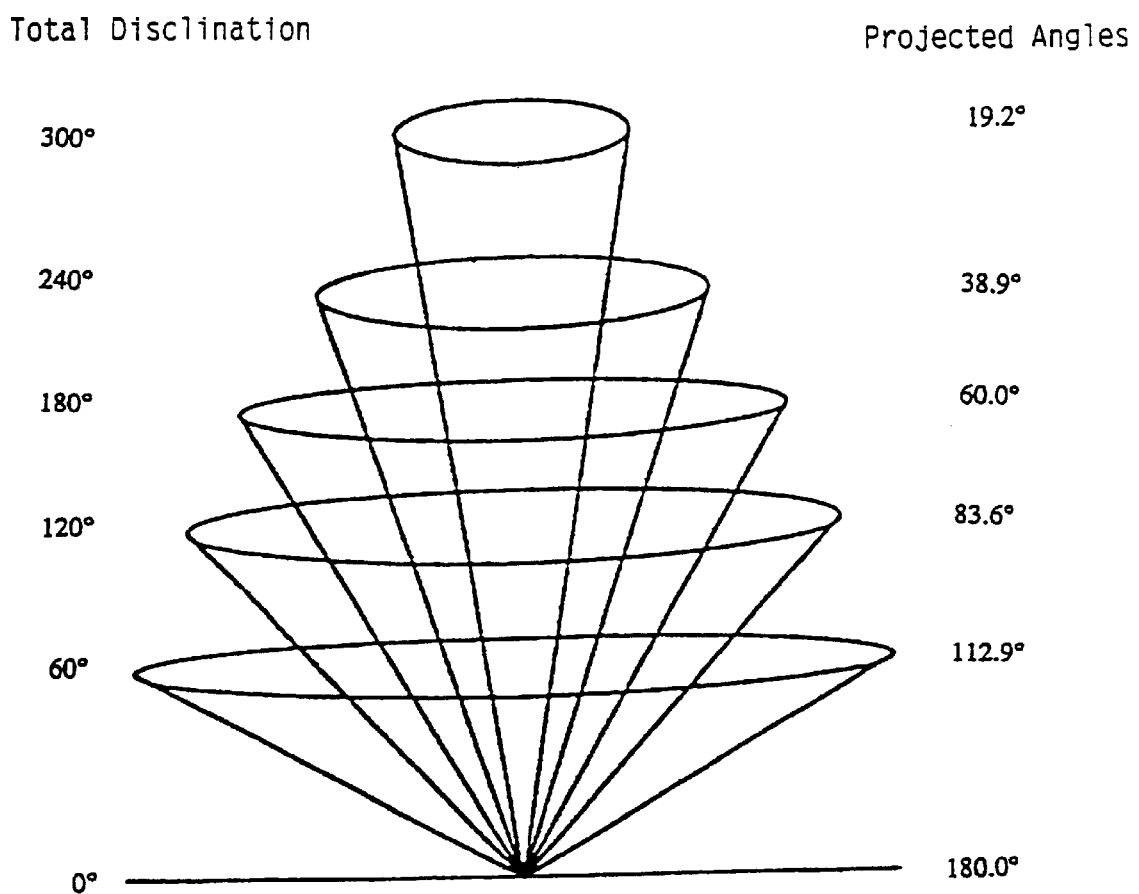
FIG. 1 is a schematic representation of the projected angles and disclinations of the cones and flat plates characteristic of the conical carbon black used in the rubber compositions of the present invention.

It is recognized that various forms of granular carbon blacks have been used for the reinforcement of rubber in rubber treads for quite some time. In general, such granular carbon blacks are characterized by having dibutylphthalate (DBP) numbers in a range of about 36 to 178 cm$^3$/100 g and Iodine adsorption values in a range of about 9 to about 250 g/kg and with an ASTM series designation, for example, of N100 to about N900 (see *The Vanderbilt Rubber Handbook*, 1978 edition, Pages 417 and 418 for carbon black descriptions). None of these granular carbon blacks are characterized with an iodine number less than about 30 combined with a DBP number greater than about 150.

By contrast, conical carbon black comprising open conical carbon structures, flat plates, carbon nanotubes and fullerenes is characterized as having an Iodine number of less than about 30 g/kg, and a DBP number of greater than about 150 cm$^3$/100 g. This carbon black having an Iodine number of less than 30 g/kg and a DBP number of greater than 150 cm$^3$/100 g is-herein referred to as conical carbon black, and can be produced as taught by PCT international application WO 98/42621, fully incorporated herein by reference. The conical carbon black generally comprises open carbon cones and flat plates; fullerenes and carbon nanotubes may also be present. The open carbon cones are generally hollow cones each made up of uninterrupted sheets of graphite, except at their open edges; due to the symmetry of graphite only five possible types of cones are possible. These correspond to a total disclination of 60°, 120°, 180°, 240° and 300°. A total disclination of 0° corresponds to a flat plate. FIG. 1, taken from international application WO 98/42621, shows schematically the projected angles of the various possible carbon cones. The conical carbon black therefore comprises open cones and flat plates of graphite of well-defined total disclinations TD (curvature), which have discrete values given by the formula $TD = N \times 60$ degrees, where $N = 0, 1, 2, 3, 4,$ or $5$, and corresponds to the effective number of pentagons necessary to produce the particular total disclination.

The concept of disclination and projected angle as applied to the conical carbon is best understood with reference to the article "Graphitic Cones and the Nucleation of Curved Carbon Surfaces" appearing in *Nature* (1997), July 31 issue, fully incorporated herein by reference. As shown in FIG. 1, the projected angles for each of the possible cones are 19.2°, 38.9°, 60°, 83.6° and 112.9°, which correspond to total disclinations of 300°, 240°, 180°, 120° and 60°, respectively. In addition, the flat plate graphitic sheet has a projected angle of 180° and a total disclination of 0°. The characteristic size, or longest dimension, of the particles is typically less that 5 micrometers and the thickness, measured as the wall thickness of the hollow cones or the thickness of the flat plate, is typically less than 100 nanometers. Cones of N=1 to 5, nanotubes, and fullerenes may make up about 20 percent of the conical carbon, with about 80 percent being mainly flat plates of N=0. Cones of specific TD, flat plates, nanotubes, and fullerenes may or may not be present in a given sample. Typically, one or more of the particulate forms are present in a given conical carbon black. Flat plates of N=0, TD=0 and a projected angle of 180° may be present as a major fraction of the conical carbon black, that is, in excess of 50 percent by weight. Cones of N=1, 2, 3, 4, or 5, fullerenes, or nanotubes may be present as a minor fraction of the conical carbon black, that is, less than 50 percent by weight.

The conical carbon material may further be characterized by an Iodine number of less than about 30 g/kg (as determined using ASTM D1510) and a DBP number of greater than about 150 cm$^3$/100 g (as determined using ASTM D2414). The conical carbon black, as disclosed herein, was supplied by Karbomont s.e.c. of Montreal, Quebec, Canada.

Typically in tire tread formulations, granular carbon black may be present, for example, in an amount of from about 30 phr to about 150 phr, alternatively about 35 to about 90 phr, and alternatively about 35 to about 55 phr. Due to the surprising and unexpected effectiveness of conical carbon black to obtain acceptable physical properties when used in relatively low concentrations in rubber, the required amount of conical carbon black when compared to typical granular carbon black, will be less, thereby achieving a weight reduction in the tire when at least a portion of the granular carbon black is replaced with a lesser amount of conical carbon black.

In the practice of this invention, the rubber composition is comprised of at least one diene-based elastomer, or rubber. Thus, it is considered that the elastomer is a sulfur curable, i.e., vulcanizable elastomer. Such elastomer, or rubber, may be selected, for example, from at least one of cis 1,4-polyisoprene rubber (natural and/or synthetic, and preferably natural rubber), 3,4-polyisoprene rubber, styrenetbutadiene copolymer rubbers, butadiene/acrylonitrile copolymer rubbers, styrene/isoprene/butadiene terpolymer rubbers, and cis 1,4-polybutadiene rubber. Also included are neoprene and butyl and halobutyl rubbers, including chlorobutyl and bromobutyl rubbers and the like.

In another aspect of this invention, the rubber is at least two of diene based rubbers. For example, a combination of two or more rubbers may include combination such as cis 1,4-polyisoprene (natural or synthetic, although natural is preferred), 3,4-polyisoprene rubber, styrene/isoprene/butadiene rubber, emulsion and solution polymerization derived styrene/butadiene rubbers, cis-1,4-polybutadiene rubbers and emulsion polymerization prepared butadiene/acrylonitrile copolymers.

In an additional aspect of this invention, an emulsion polymerization derived styrene-butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 percent for the E-SBR can be considered beneficial for a purpose of enhancing traction, or skid resistance, of the tire tread. The presence of the E-SBR is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50 percent. In one aspect, the E-SBR may also contain acrylonitrile to form a terpolymer rubber, such as E-SBAR, in amounts for example, of about 2 to about 30 weight percent bound acrylonitrile in the terpolymer.

Emulsion polymerization prepared butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably 15 to about 40 weight percent. The S-SBR can be conveniently prepared, for example, by organo-lithium catalyzation in the presence of an organic hydrocarbon solvent. A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI is more fully described in U.S. Pat. No. 5,087,668 which is incorporated herein by reference.

The cis-1,4-polybutadiene rubber (BR) is considered to be beneficial for a purpose of enhancing the tire tread's wear or treadwear. Such BR can be prepared, for example, by organic solution polymerization of 1,3-butadiene. The BR may conveniently characterized, for example, by having at least a 90 percent cis-1,4 content. The cis-1,4-polyisoprene and cis 1,4-polyisoprene natural rubber are well known to those having skill in the rubber art.

While the focus above has been on tread rubber, the invention is not limited to such. Other applications for the rubber composition include all tire components, belts, hoses, molded rubber goods and the like. Various diene-based elastomers may be used in the practice of this invention. Preferably, such elastomers are sulfur curable elastomers. For example, such elastomers may be selected from homopolymers and copolymers of conjugated dienes such as 1,3-butadiene and isoprene, and from copolymers of conjugated dienes such as, for example, 1,3-butadiene and/or isoprene with a vinyl aromatic compound such as styrene or alpha-methylstyrene. Additional polymers such as neoprene, butyl rubber and halobutyl rubber (chlorobutyl, bromobutyl, and Exxon Expro polymers) are considered to be within the scope of the invention.

Representative of homopolymers of conjugated dienes are, for example, cis-1,4-polybutadiene, a polymer of 1,3-butadiene and cis 1,4-polyisoprene. Representative of copolymers of conjugated dienes are, for example, isoprenelbutadiene copolymers. Representative of copolymers of conjugated diene(s) and vinyl aromatic compounds are, for example, styrene butadiene copolymers and styrene/isoprene/butadiene terpolymers.

Most commercially available tire treads contain various amount of additives. Typically amounts of tackifier resins, if used, comprise about 0.5 to about 10 phr, usually about 1 to about 5 phr. Typical amounts of processing aids and rubber compounding ingredients comprise about 1 to about 50 phr. Such processing aids can include, for example, aromatic, naphthenic and/or paraffinic processing oils. Stearic acid is typically referred to as a rubber compounding ingredient. As purchased, it typically contains primarily stearic acid with small amounts of at least one of oleic acid, linolenic acid and palmitolic and/or palmitic acid. The mixture may also contain small amounts (less than about six weight percent) of myristic acid, arachidic acid and/or arachidonic acid. Such material or mixture is conventionally referred to in the rubber compounding art as stearic acid. Typical amounts of antioxidants comprise about 1 to about 5 phr. Representative antioxidants may be, for example, diphenyl-p-phenylenediamine and others such as, for example, those disclosed in *The Vanderbilt Rubber Handbook*, (1978), Pages 343 through 362. Typical amounts of antiozonants comprise about 0.5 to about 3 phr. Typical antiozonants can be found on Pages 363 through 367 in *The Vanderbilt Rubber Handbook*, (1978). Typical amounts of fatty acids, if used, which can include stearic acid comprise about 0.5 to about 3 phr. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5 phr, sometimes from 2 to 2.5 phr, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

In another alternative embodiment of this invention, the formulation can additionally contain silica and/or a silica coupling agent, wherein the amount of particulate silica ranges from about 5 to about 90, optionally about 25 to about 90, phr and wherein the silica coupling agent is contained in an amount from wherein the weight ratio of silica coupler to silica is from about 0.1/1 to about 0.2/1.

The commonly employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in *The Journal of the American Chemical Society*, Volume 60, Page 304 (1930).

Silica particles may be considered for use in this invention such as, only for example herein, and without limitation, silicas commercially available from PPG Industries under the Hi-Sil trademark with designations 210, 243, etc.; silicas available from Rhodia with, for example, designations Zeosil 1165MP and Zeosil 165GR; and silicas from Akzo Chemical, etc.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) in the preceding non-productive mix stage(s). The rubber, silica (if used) and silica coupler (if used), and conical carbon black, and other granular carbon black (if used) are mixed in one or more non-productive mix stages. The terms "non-productive" and "productive" mix stages are well known to those having skill in the rubber mixing art. The tire can be built, shaped, molded and cured by various methods which are known and will be readily apparent to those having skill in such art.

The best mode for carrying out the invention will now be described for the purposes of illustrating the best mode known to the applicant at the time. The examples are illustrative only and not meant to limit the invention, as measured by the scope and spirit of the claims. The following rubber compounds were prepared using the procedure outlined in Example I and exemplified in the following Table 1.

EXAMPLE I

Rubber compositions were prepared using various rubber reinforcing, conventional granular carbon blacks and conical carbon black as reinforcement. In particular, a rubber composition containing conventional rubber reinforcing granular carbon black N762 is prepared and identified herein as Sample A.

A rubber composition containing conventional rubber reinforcing granular carbon black N660 is prepared and identified herein as Sample B. A rubber composition containing conventional rubber reinforcing granular carbon black N550 is prepared and identified herein as Sample C.

A rubber composition containing conventional rubber reinforcing granular carbon black N326 is prepared and identified herein as Sample D. A rubber composition containing conventional rubber reinforcing granular carbon black N299 is prepared and identified herein as Sample E.

A rubber composition containing conventional rubber reinforcing granular carbon black N660 and conical carbon black is prepared and identified herein as Sample F. A rubber composition containing conventional rubber reinforcing granular carbon black Karbomont KOG 5CB is prepared and identified herein as Sample G.

A rubber composition containing conventional rubber reinforcing granular carbon black Karbomont KOG CLS is prepared and identified herein as Sample H. A rubber composition containing conventional rubber reinforcing granular carbon black acetylene black is prepared and identified herein as Sample I.

The following Table 1 illustrates the rubber composition used in this Example. Table 2 illustrates the Iodine and DBP number characteristics of the granular carbon blacks and conical carbon used in the formulations illustrated in Table 1. The rubber composition non-productive batch was prepared by first mixing the ingredients exclusive of the vulcanization inhibitor, accelerator and sulfur in an internal rubber mixer for about 4 minutes to a temperature of about 160° C.

Then, to the resulting rubber mixture productive batch was mixed, in an internal rubber mixer, the remaining vulcanization inhibitor, accelerator and sulfur for about two minutes to a temperature of about 110° C.

The rubber compositions were then analyzed for cure characteristics using an MDR Rheometer. The results of the Rheometer testing are given in Table 3. Rubber compositions were cured as sheets for 36 minutes at 150° C. followed by testing of physical properties. Physical properties for each sample composition A–I are given in Table 4.

TABLE 1

Rubber Recipes (all amounts in phr)

| | A | B | C | D | E | F | G | H | I |
|---|---|---|---|---|---|---|---|---|---|
| Non-productive Mix Stage | | | | | | | | | |
| Nat2200[1] | 100 | 100 | 100 | 100 | 100 | 100 | 100 | 100 | 100 |
| N762[2] | 25 | 0 | 0 | 0 | 0 | 0 | 0 | 0 | 0 |
| N660[3] | 0 | 25 | 0 | 0 | 0 | 0 | 0 | 0 | 0 |
| N550[4] | 0 | 0 | 25 | 0 | 0 | 9.5 | 0 | 0 | 0 |
| N326[5] | 0 | 0 | 0 | 25 | 0 | 0 | 0 | 0 | 0 |
| N299[6] | 0 | 0 | 0 | 0 | 25 | 0 | 0 | 0 | 0 |
| Conical carbon[7] | 0 | 0 | 0 | 0 | 0 | 15.5 | 0 | 0 | 0 |
| KOG 5CB[8] | 0 | 0 | 0 | 0 | 0 | 0 | 25 | 0 | 0 |
| KOG CLS[9] | 0 | 0 | 0 | 0 | 0 | 0 | 0 | 25 | 0 |
| Acetylene black[10] | 0 | 0 | 0 | 0 | 0 | 0 | 0 | 0 | 25 |
| Stearic acid | 2 | 2 | 2 | 2 | 2 | 2 | 2 | 2 | 2 |
| Processing oil[11] | 3 | 3 | 3 | 3 | 3 | 3 | 3 | 3 | 3 |
| Zinc oxide | 3 | 3 | 3 | 3 | 3 | 3 | 3 | 3 | 3 |
| Antioxidant[12] | 2 | 2 | 2 | 2 | 2 | 2 | 2 | 2 | 2 |
| Productive Mix Stage | | | | | | | | | |
| Sulfur | 1.2 | 1.2 | 1.2 | 1.2 | 1.2 | 1.2 | 1.2 | 1.2 | 1.2 |
| Sulfenamide[13] | 1.6 | 1.6 | 1.6 | 1.6 | 1.6 | 1.6 | 1.6 | 1.6 | 1.6 |

[1]Synthetic cis 1,4-polyisoprene rubber obtained from The Goodyear Tire & Rubber Company
[2-6]Carbon blacks, granular, with ASTM designations
[7]Obtained from Karbomont, subsidiary of Kvaerner, as carbon black in the form of cones and plates with properties described in Table 2
[8]Obtained from Karbomont, subsidiary of Kvaerner, identified as KOG 5CB, a granular conductive carbon black with properties described in Table 2
[9]Obtained from Karbomont, subsidiary of Kvaerner, identified as KOG CLS, a granular conductive carbon black with properties described in Table 2
[10]Obtained as acetylene black from the Chevron Company
[11]Naphthenic/paraffinic rubber processing oil
[12]Of the paraphenylenediame type
[13]Of the n-tert-butyl-2-benzothiazole sulfenamide type

TABLE 2

Iodine Adsorption and DBP Numbers

| Carbon Blacks | Iodine (g/kg) | DBP (cm³/100 g) |
|---|---|---|
| N762[1] | 27 | 65 |
| N660[2] | 36 | 90 |
| N550[3] | 43 | 121 |
| N326[4] | 82 | 72 |
| N299[5] | 108 | 124 |
| Conical carbon[6] | 25 | 160 |
| KOG 5CB[7] | 68 | 155 |
| KOG CLS[8] | 15 | 60 |
| Acetylene black[9] | 89 | 202 |

[1–5] Carbon blacks, granular, with ASTM designations
[6] Obtained as carbon black as reported in Table 1
[7] Obtained as carbon black as reported in Table 1
[8] Obtained as carbon black as reported in Table 1
[9] Obtained as acetylene black as report in Table 1

TABLE 3

MDR Rheometer (100 cpm at 150° C.)

| Sample No. | A | B | C | D | E | F | G | H | I |
|---|---|---|---|---|---|---|---|---|---|
| Maximum torque (Mpa) | 10.5 | 11.2 | 11.6 | 11.2 | 12.2 | 11.6 | 12.6 | 10.5 | 13.3 |
| Minimum torque (Mpa) | 1.6 | 1.8 | 1.9 | 1.9 | 1.9 | 1.8 | 2 | 1.7 | 2.1 |
| Delta torque | 8.9 | 9.4 | 9.7 | 9.3 | 10.3 | 9.8 | 10.6 | 8.9 | 11.2 |
| T90 (min) | 12.1 | 10.5 | 11 | 10.3 | 11.1 | 12.6 | 17.7 | 21.9 | 14 |
| T25 (min) | 7.5 | 6.4 | 6.9 | 6.1 | 6.5 | 8.1 | 11.9 | 15.6 | 9.3 |
| T1 (min) | 6.5 | 5.4 | 5.9 | 5.1 | 5.3 | 6.8 | 10.4 | 14 | 8 |

TABLE 4

Physical Properties
Assigned sheet 36 min.; cure at 150° C.

| Sample No. | A | B | C | D | E | F | G | H | I |
|---|---|---|---|---|---|---|---|---|---|
| Tensile/Elongation/Modulus | | | | | | | | | |
| Tensile (MPa) | 22.4 | 22.2 | 17.7 | 22.6 | 23.2 | 23.7 | 22.2 | 16.9 | 21.2 |
| Elongation(%) | 603 | 576 | 497 | 603 | 572 | 539 | 594 | 591 | 560 |
| 100% modulus | 1.2 | 1.3 | 1.3 | 1.2 | 1.3 | 2.2 | 1.3 | 1.2 | 1.4 |
| 200% modulus | 2.4 | 2.8 | 2.9 | 2.5 | 2.9 | 5.7 | 2.8 | 2.2 | 3.2 |
| 300% modulus | 4.8 | 5.7 | 5.9 | 4.8 | 6.1 | 9.3 | 5 | 3.5 | 6.2 |
| Shore A Hardness | | | | | | | | | |
| 23° C. | 46.2 | 46.8 | 47.5 | 48 | 49.6 | 53.3 | 49.8 | 45 | 51.6 |
| 100° C. | 44.9 | 46 | 46.4 | 45.8 | 47.3 | 52.2 | 47.9 | 44.5 | 49.7 |
| Zwick Rebound | | | | | | | | | |
| 23° C. | 75.9 | 78.7 | 77.8 | 74.1 | 72 | 76.8 | 74.3 | 82.1 | 69.1 |
| 100° C. | 82.1 | 85.1 | 84.7 | 80 | 79.4 | 86.2 | 81.9 | 88.1 | 79.8 |

Discussion

It should be emphasized that this invention is not limited to use of conical carbon black in tires, but rather is useful in all rubber compositions. The invention either supplements or replaces granular carbon blacks which are typically used as rubber reinforcement. In particular, the use of conical carbon as a partial or full replacement for conventional granular carbon in a rubber composition is observed to result in unexpectedly superior physical properties for the rubber composition as compared with properties of a rubber composition using only the conventional carbon black. For example, use of 15.5 phr of conical carbon along with 9.5 phr of N550 granular carbon black in Sample F is observed to result in substantially superior modulus and hardness as compared with the other conventional granular carbon blacks tested.

Microscopic analysis of physical test samples indicated that the morphology of the conical carbon black remained intact after mixing with the rubber composition, and little if any breakage of the conical carbon black was observed. Thus, while some of the effect on physical properties may be due to exposure of newly created broken carbon surfaces to the rubber, some of the effect may also be attributed to the original morphology of the particles.

Additionally, some orientation of the carbon flat plates was noted. while not wishing to be bound by any particular theory, it is possible that the interaction of the rubber with the extended surface areas of the conical carbon particles, especially the flat plates, along with the orientation of flat plates led to the observed increase in physical properties. It may be expected that the orientation of the particles will impart some degree of anisotropy to one or more physical properties of rubber samples fabricated using conical carbon black containing a substantial fraction of flat plates.

It is also notable that the combination of the Iodine adsorption and DBP numbers reported for the conical carbon black are not similar to those typical of conventional granular carbon blacks. As indicated in Table 2, the Iodine adsorption and DBP numbers reported for conical carbon are 25 g/kg and 160 cm³/100 g, respectively, indicating relatively large particles with a high degree of aggregation. Typically, granular carbon blacks show a high degree of aggregation only with smaller particle sizes. This unique combination of both very low Iodine adsorption and very high DBP may account for the unexpectedly superior physical properties observed for rubber compositions made using the conical carbon black.

Numerous applications for rubber compositions made using conical carbon are apparent. Applications may include tires for consumer and commercial vehicles, racing cars, aircraft, off the road tires, farm, truck, and miscellaneous other tires. Higher carbon black loading typically required for racing tires may possibly be reduced using conical carbon black, without sacrificing one or more physical properties. Similarly, desirable weight reduction may possibly be achieved in aircraft tires using less conical carbon black while maintaining required physical properties obtainable only with higher loading of conventional carbon black. Other applications where the advantages of conical carbon in rubber is apparent include fabricated industrial products such as hoses, belts, mechanical parts and the like, having at least one component fabricated from a rubber composition. Industrial products may include but are not limited to belts, hoses, transmission belts, conveyor belts, and molded rubber goods, and the like.

While certain representative embodiments and details have been shown for the purpose of illustrating the invention, it will be apparent to those skilled in this art that various changes and modifications may be made therein without departing from the spirit or scope of the invention.

What is claimed is:

1. A composition comprising:
   at least one diene-based elastomer;
   at least one sulfur vulcanizing agent;
   at least one vulcanization accelerator; and
   conical carbon black characterized by a total disclination TD given by the formula $TD=N \times 60$ degrees, where $N=0, 1, 2, 3, 4,$ or $5$.

2. The composition of claim 1, wherein said conical carbon black comprises open carbon cones and flat plates.

3. The composition of claim 1, wherein said conical carbon black comprises a major weight fraction of carbon flat plates having a TD=0 and a projected angle of 180°, and a minor weight fraction of open carbon cones of TD=1, 2, 3, 4, or 5.

4. The composition of claim 1, wherein said conical carbon black comprises about 80 percent carbon flat plates having a TD=0 and a projected angle of 180°.

5. The composition of claim 1, wherein said conical carbon has an Iodine number of less than 30 g/kg and a DBP number of greater than 150 cm$^3$/100 g.

6. The composition of claim 1, further comprising at least one second reinforcement selected from the group consisting of granular carbon blacks and silica, wherein said conical carbon black and said at least one second reinforcement are present in a combined amount equal to from about 10 phr to about 150 phr, based on 100 parts of said at least one diene-based elastomer, wherein said combined amount is composed of from about 5 to about 100 weight percent of said conical carbon black and from about 95 to zero weight percent of said at least one second reinforcement.

7. The composition of claim 1, wherein said at least one diene-based elastomer is selected from the group consisting of homopolymers and copolymers of conjugated dienes and wherein the homopolymer is selected from the group consisting of natural cis-1,4-polyisoprene rubber, synthetic cis-1,4-polyisoprene rubber, 3,4-polyisoprene rubber, cis-1,4-polybutadiene rubber and mixtures thereof and wherein the copolymer is selected from the group consisting of isoprene/butadiene copolymer rubbers, styrenetbutadiene copolymer rubbers, styrene/isoprene copolymer rubbers, butadiene/acrylonitrile copolymer rubbers, isoprene/acrylonitrile copolymer rubbers, styrene/isoprene/butadiene terpolymer rubbers, alpha-methylstyreneibutadiene copolymer rubbers, alpha-methylstyrenelisoprene copolymer rubbers, butadienetacrylonitrile copolymer rubbers, isoprene/acrylonitrile copolymer rubbers, alpha-methylstyrene/isoprene/butadiene terpolymer rubbers, neoprene, butyl rubbers, halobutyl rubbers, chlorobutyl rubber, bromobutyl rubbers, and mixtures thereof.

8. A fabricated product comprising at least one component fabricated from a rubber composition, said rubber composition comprising:
   at least one diene-based elastomer;
   at least one sulfur vulcanizing agent;
   at least one vulcanization accelerator; and
   conical carbon black characterized by a total disclination TD given by the formula $TD=N \times 60$ degrees, where $N=0, 1, 2, 3, 4,$ or $5$.

9. The fabricated product of claim 8, wherein said conical carbon black comprises open carbon cones and flat plates.

10. The fabricated product of claim 8, wherein said conical carbon black comprises a major weight fraction of carbon flat plates having a TD=0 and a projected angle of 180°, and a minor weight fraction of open carbon cones of TD=1, 2, 3, 4, or 5.

11. The fabricated product of claim 8, wherein said conical carbon black has an Iodine number of less than 30 g/kg and a DBP number of greater than 150 cm$^3$/100 g.

12. The fabricated product of claim 8, said vulcanizable rubber composition further comprising at least one second reinforcement selected from the group consisting of granular carbon blacks and silica, wherein said conical carbon black and said at least one second reinforcement are present in a combined amount equal to from about 10 phr to about 150 phr, based on 100 parts of said at least one diene-based elastomer, wherein said combined amount is composed of from about 5 to about 100 weight percent of said conical carbon black and from about 95 to zero weight percent of said at least one second reinforcement.

13. The fabricated product of claim 8, wherein said at least one diene-based elastomer is selected from the group consisting of homopolymers and copolymers of conjugated dienes and wherein the homopolymer is selected from the group consisting of natural cis-1,4-polyisoprene rubber, synthetic cis-1,4-polyisoprene rubber, 3,4-polyisoprene rubber, cis-1,4-polybutadiene rubber and mixtures thereof and wherein the copolymer is selected from the group consisting of isoprene/butadiene copolymer rubbers, styrene/butadiene copolymer rubbers, styrene/isoprene copolymer rubbers, butadiene/acrylonitrile copolymer rubbers, isoprene/acrylonitrile copolymer rubbers, styrene/isoprene/butadiene terpolymer rubbers, alpha-methylstyrene/butadiene copolymer rubbers, alpha-methylstyrene/isoprene copolymer rubbers, butadiene/acrylonitrile copolymer rubbers, isoprene/acrylonitrile copolymer rubbers, alpha-methylstyrene/isoprene/butadiene terpolymer rubbers, neoprene, butyl rubbers, halobutyl rubbers, chlorobutyl rubber, bromobutyl rubbers, and mixtures thereof.

14. The fabricated product of claim 8, wherein said fabricated product is selected from the group consisting of tires, hoses, transmission belts, conveyor belts, and molded rubber goods.

15. The fabricated product of claim 8, wherein said fabricated product is a tire.

16. The fabricated product of claim 8, wherein said fabricated product is a tire and said-at least one component is a tire tread.

17. The fabricated product of claim 9, wherein said fabricated product is a tire.

18. The fabricated product of claim 9, wherein said fabricated product is a tire and said at least one component is a tire tread.

19. The fabricated product of claim 10, wherein said fabricated product is a tire.

20. The fabricated product of claim 10, wherein said fabricated product is a tire and said at least one component is a tire tread.

21. The fabricated product of claim 11, wherein said fabricated product is a tire.

22. The fabricated product of claim 11, wherein said fabricated product is a tire and sad at least one component is a tire tread.

23. The fabricated product of claim 12, wherein said fabricated product is a tire.

24. The fabricated product of claim 12, wherein said fabricated product is a tire and said at least one component is a tire tread.

25. The fabricated product of claim 13, wherein said fabricated product is a tire.

26. The fabricated product of claim 13, wherein said fabricated product is a tire and said at least one component is a tire tread.

* * * * *

UNITED STATES PATENT AND TRADEMARK OFFICE
CERTIFICATE OF CORRECTION

PATENT NO. : 6,476,154 B1  
DATED : November 5, 2002  
INVENTOR(S) : Neil Arthur Maly et al.

It is certified that error appears in the above-identified patent and that said Letters Patent is hereby corrected as shown below:

Column 6,
Line 13, delete "styrenetbutadiene" and insert -- styrene/butadiene --.

Column 9,
Line 34, delete "N660" and insert -- N550 --.

Column 13,
Line 65, delete "styrenetbutadiene" and insert -- styrene/butadiene --.

Column 14,
Line 2, delete "alpha-methylstyreneibutadiene" and insert -- alpha-methylstyrene/butadiene --.
Line 3, delete "alpha-methylstyrenelisoprene" and insert -- alpha-methylstyrene/isoprene --.
Lines 3-4, delete "butadien-etacrylonitrile" and insert -- butadiene/acrylonitrile --.

Column 15,
Line 14, delete "sad" and insert -- said --.

Signed and Sealed this

Seventeenth Day of June, 2003

JAMES E. ROGAN  
*Director of the United States Patent and Trademark Office*